United States Patent
Cho et al.

(10) Patent No.: US 10,324,514 B2
(45) Date of Patent: Jun. 18, 2019

(54) MCU WAKE-UP DEVICE AND METHOD IN SLEEP MODE

(71) Applicant: LG Chem, Ltd., Seoul (KR)

(72) Inventors: Sung Hyun Cho, Daejeon (KR); Jin Seok Heo, Daejeon (KR); Duk Su Kim, Sejong-Si (KR); Jong Kook Lee, Daejeon (KR); Ho Soo Kim, Daejeon (KR); Geun Wook Lim, Daejeon (KR); Jong Doo Park, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 15/911,928

(22) Filed: Mar. 5, 2018

(65) Prior Publication Data

US 2018/0253137 A1  Sep. 6, 2018

(30) Foreign Application Priority Data

Mar. 6, 2017  (KR) .......................... 10-2017-0028099

(51) Int. Cl.
*G06F 1/32* (2019.01)
*H02J 7/00* (2006.01)
*H02M 3/157* (2006.01)
*G06F 1/3212* (2019.01)
*G06F 1/3234* (2019.01)
*G06F 1/26* (2006.01)

(52) U.S. Cl.
CPC ............ *G06F 1/3212* (2013.01); *G06F 1/263* (2013.01); *G06F 1/3243* (2013.01); *H02J 7/0026* (2013.01); *H02J 7/0065* (2013.01); *H02M 3/157* (2013.01); *G06F 1/26* (2013.01)

(58) Field of Classification Search
CPC ..................................... G06F 1/26; G06F 1/32
See application file for complete search history.

(56) References Cited

U.S. PATENT DOCUMENTS

| 6,271,642 | B1 * | 8/2001 | Dougherty | G08B 29/181 |
| | | | | 320/104 |
| 9,774,265 | B2 * | 9/2017 | Pasqua | H02M 3/33515 |
| 2013/0261816 | A1 * | 10/2013 | Tang | H02J 1/00 |
| | | | | 700/286 |
| 2014/0117895 | A1 * | 5/2014 | Lee | H02P 6/17 |
| | | | | 318/400.11 |
| 2016/0162014 | A1 * | 6/2016 | Jeon | G06F 1/26 |
| | | | | 713/323 |
| 2017/0013694 | A1 * | 1/2017 | Nakamura | H05B 33/0887 |

FOREIGN PATENT DOCUMENTS

| JP | 2015173581 A | * | 10/2015 | ................ H02J 1/00 |
| JP | 2016111830 A | * | 6/2016 | ............ H02J 7/0068 |
| KR | 20110065552 A | * | 6/2011 | ............... H02J 5/005 |

* cited by examiner

*Primary Examiner* — Phil K Nguyen
(74) *Attorney, Agent, or Firm* — Lerner, David, Littenberg, Krumholz & Mentlik, LLP

(57) ABSTRACT

The present invention provides a device and method for waking up an MCU of a BMS operating in a sleep mode. More specifically, the present invention provides a device and method for waking up an MCU of a BMS that is in a sleep mode automatically by generating a wake-up signal only once, when an external power source is connected, without user's operation.

4 Claims, 2 Drawing Sheets

MCU WAKE-UP DEVICE AND METHOD IN SLEEP MODE

CROSS-REFERENCE TO RELATED APPLICATION

This application claims priority to Korean Patent Application No. 10-2017-0028099 filed on Mar. 6, 2017 and all the benefits accruing therefrom under 35 U.S.C. § 119, the contents of which are incorporated by reference in their entirety.

BACKGROUND

The present invention relates to a device and method for waking up a microcontroller unit (MCU) operating in a sleep mode.

Recently, a high power secondary battery using a non-aqueous electrolyte having a high energy density has been developed. To be used for devices that require strong power for driving motors such as electric vehicles, a plurality of high-output secondary batteries are connected in series to constitute a large-capacity secondary battery.

As described above, one large-capacity secondary battery (hereinafter referred to as "battery") is usually composed of a plurality of batteries connected in series. Particularly, in the case of a battery for a hybrid electric vehicle (HEV), as several to dozens of batteries perform charging and discharging alternately, there is a need to control the battery so as to maintain an appropriate operating state while controlling such charging and discharging.

To this end, a battery management system (BMS) for monitoring the state of the battery as a whole is provided. The BMS monitors the battery voltage, current, temperature, etc. to estimate a state of charge (SOC) of the battery by calculation and controls the battery so that the fuel consumption efficiency of the vehicle becomes the best.

Meanwhile, when the SOC of the battery drops below a predetermined value, the MCU of the BMS also operates in the sleep mode in order to protect the battery and to prevent discharging and reduce battery consumption.

Since the MCU of the BMS operating in the sleep mode does not operate until the wake-up signal is applied, in order to control charging/discharging, conventionally, a user has to wake it up.

In this way, it is troublesome for a user to wake up the MCU of the BMS in the sleep mode directly.

As a solution to this problem, there is a technique of waking up the sleep mode BMS as an external power source when the external power source is applied.

In relation to the technique of waking up the sleep mode BMS in this manner, if an external power source is connected, it will continue to wake up the BMS so that even if the SOC of the battery becomes a predetermined value or less, the BMS may not return to the sleep mode again. Thus, there is a problem that the battery is over-discharged.

Therefore, when an external power source is inputted, the present invention generates the MCU of the BMS, which is in the sleep mode only once, in order to wake up the MCU of the BMS. Even if an external power source is connected after the MCU of the BMS wakes up, when the SOC of the battery is insufficient, a device and method for the MCU of the BMS to operate in the sleep mode again are proposed.

SUMMARY

The present invention provides a device and method for waking up an MCU of a BMS operating in a sleep mode.

More specifically, the present invention provides a device and method for waking up an MCU of a BMS that is in a sleep mode automatically by generating a wake-up signal only once, when an external power source is connected, without user's operation.

In accordance with an exemplary embodiment, an MCU wake-up device of a BMS includes: an MCU power generation unit configured to supply power to an MCU of the BMS; an external power source connected to a first switching unit and a second switching unit to apply a predetermined voltage to the first switching unit and the second switching unit; a first switching unit configured to control connection between the external power source and the MCU power generation unit; and a second switching unit configured to control on or off of the first switching unit; wherein when the external power source is simultaneously applied to the first switching unit and the second switching unit, the first switching unit is turned on and after a predetermined time, and the second switching unit is turned on to turn off the first switching unit, such that the MCU power generation unit provides wake-up power to the MCU only while the first switching unit is turned on.

The first switching unit may include a first field effect transistor (FET) wherein a drain terminal of the first FET may be connected to an output terminal of the external power source, a source terminal may be connected to the MCU power generation unit, and a gate terminal may be connected to an output terminal of the external power source and a drain terminal of a second FET.

The second switching unit may include: a second FET; a resistor having a predetermined resistance value; and a capacitor having a predetermined capacitance, wherein a drain terminal of the second FET may be connected to a gate terminal of the first FET, a gate terminal may be connected to an output terminal of the external power source, a resistor having the predetermined resistance value, and a capacitor having the predetermined capacitance, and a source terminal may be connected to ground.

The resistor having the predetermined resistance value and the capacitor having the predetermined capacitance may be connected in parallel; one end of the resistor having the predetermined resistance value and the capacitor having the predetermined capacitance connected in parallel may be connected to the gate terminal of the second FET and the other end is connected to the ground; and when the external power source is simultaneously applied to the first FET and the second FET, the second FET may be turned on later by a time constant defined by the resistor having the predetermined resistance value and the capacitor having a predetermined capacity to turn off the first FET that is turned on at the same time the external power source is applied.

In accordance with another exemplary embodiment, a method for waking up an MCU of a BMS includes: an external power source applying operation for applying an external power source; an MCU wake-up signal inputting operation in which the external power source inputs a wake-up signal to the MCU through the MCU power generation unit when the external power source is applied; and an external power source blocking operation for blocking the external power source applied to the MCU power generation unit after a predetermined time.

The external power source applying operation may include simultaneously applying an external power source to a first switching unit provided between an output terminal of the external power source and the MCU power generation unit and a second switching unit provided between the output terminal of the external power source and the first switching unit so as to turn on the first switching unit and the second switching unit.

In the wake-up signal generation operation, when the external power source is simultaneously applied to the first switching unit and the second switching unit, the second FET of the second switching unit may be turned on later than the first FET of the first switching unit by a time constant defined by a resistor having a predetermined value and a capacitor having a predetermined capacitance in the second switching unit and the second switching unit is connected to ground; and when the external power source is applied, the first FET of the first switching unit may be immediately turned on, the first switching unit connects the external power source and the MCU power generation unit, wherein in the external power source blocking operation, when the second switching unit is turned on, the first switching unit may be connected to the ground to disconnect the external power source and the MCU power generation unit.

In the MCU wake-up signal inputting operation, the MCU power generation unit may input a wake-up signal to the MCU of the BMS until the first switching unit is turned off by on of the second switch unit from a time when the external power source is connected.

BRIEF DESCRIPTION OF THE DRAWINGS

Exemplary embodiments can be understood in more detail from the following description taken in conjunction with the accompanying drawings, in which.

DETAILED DESCRIPTION OF EMBODIMENTS

Figure 1:
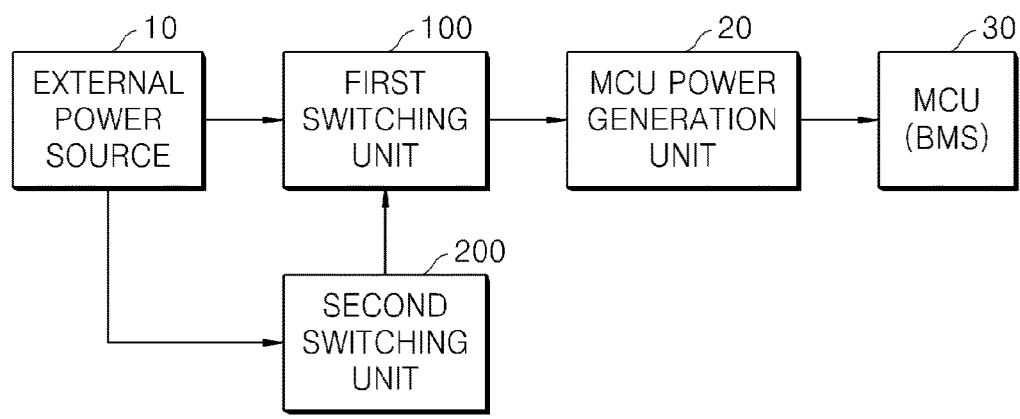
FIG. 1 is a general configuration diagram according to an embodiment of the present invention.

Hereinafter, embodiments of the present invention will be described in detail with reference to the accompanying drawings so that those skilled in the art can easily carry out the present invention. The present invention may, however, be embodied in different forms and should not be construed as limited to the embodiments set forth herein. Parts not relating to description are omitted in the drawings in order to clearly describe the present invention and like reference numerals refer to like elements throughout.

Although the terms "first," "second," etc., may be used herein to describe various elements, these elements should not be limited by these terms. The above terms are used only to distinguish one component from another. For example, a first component may be referred to as a second component and vice versa without departing from the scope of the present invention. Terms used in this specification are used to describe specific embodiments, and are not intended to limit the scope of the present invention. The singular expressions include plural expressions unless the context clearly dictates otherwise.

Throughout the specification, when a portion is referred to as being "connected" to another portion, it includes not only "directly connected" but also "electrically connected" with another element therebetween. Furthermore, when it is described that one comprises (or includes or has) some elements, it should be understood that it may comprise (or include or has) only those elements, or it may comprise (or include or have) other elements as well as those elements if there is no specific limitation. The term "~ing operation" or "operation of ~ing" used throughout the specification does not mean "operation for ~ing".

Terms used in this specification may be currently widely used general terms in consideration of functions in the present invention but may vary according to the intents of those skilled in the art, precedents, or the advent of new technology. Additionally, in certain cases, there may be terms the applicant selects arbitrarily and in this case, their meanings are described in a corresponding description part of the present invention. Accordingly, terms used in the present invention should be defined based on the meaning of the term and the entire contents of the present invention instead of the simple term name 1. MCU Wake-Up Device of BMS in Sleep Mode According to Embodiment of Present Invention FIG. 1 is a configuration diagram of an MCU wake-up device of a BMS in a sleep mode according to an embodiment of the present invention.

Figure 2:
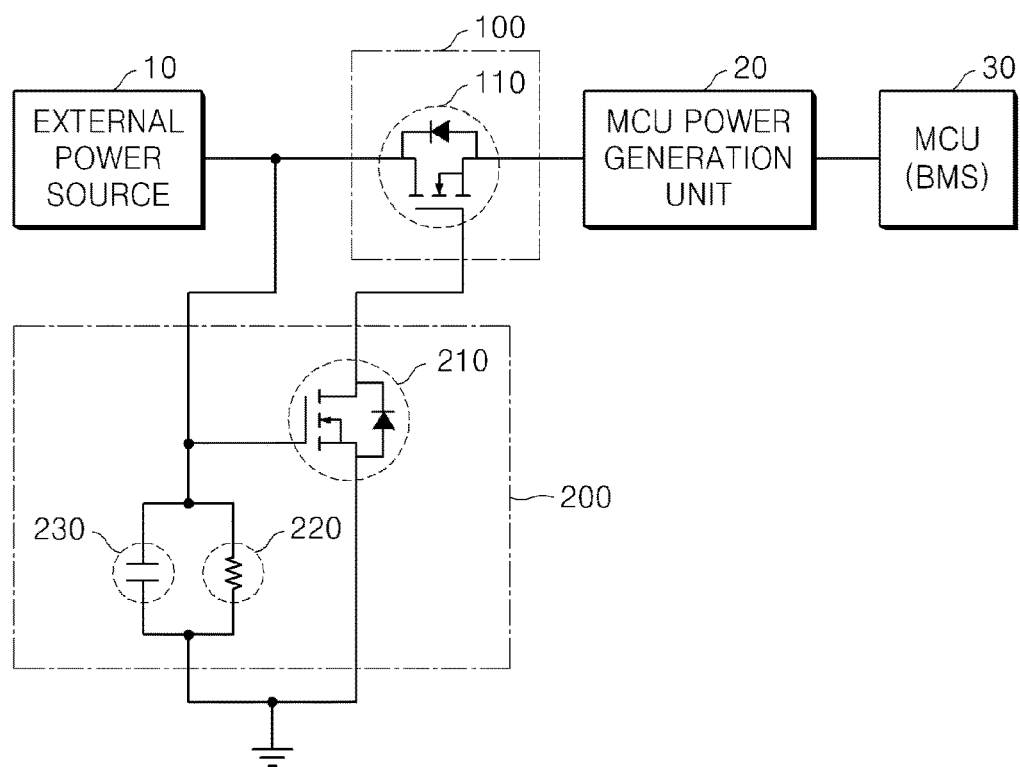
FIG. 2 is an exemplary circuit diagram of an actual circuit configuration according to an embodiment of the present invention.

FIG. 2 is a specific circuit diagram of an MCU wake-up circuit of a BMS in a sleep mode according to an embodiment of the present invention.

Hereinafter, an MCU wake-up device of a BMS in a sleep mode according to an embodiment of the present invention will be described with reference to FIGS. 1 and 2.

The MCU wake-up device of the BMS in a sleep mode according to an embodiment of the present invention may include an MCU power generation unit 20 for supplying power to the MCU of the BMS, an external power source 10 connected to a first switching unit 100 and a second switching unit 200 for applying a predetermined voltage to the first switching unit 100 and the second switching unit 200, the first switching unit 100 for controlling connection between the external power source 10 and the MCU power generation unit 20, and the second switching unit 200 for controlling on or off of the first switching unit 100. When the external power source 10 is simultaneously applied to the first switching unit 100 and the second switching unit 200, the first switching unit 100 is turned on and after a predetermined time, the second switching unit 200 is turned on to turn off the first switching unit 100 so that from when the external power source 10 is applied until the first switching unit 100 is turned off, the wake-up power may be supplied from the MCU power generation unit 20 to the MCU 30.

More specifically, the first switching unit 100 includes a first FET 110. The drain terminal of the first FET 110 may be connected to the output terminal of the external power source 10. The source terminal may be connected to the MCU power generation unit 20. The gate terminal may be connected to the output terminal of the external power source 10 and the drain terminal of the second FET 210.

The second switching unit 200 includes a second FET 210, a resistor 220 having a predetermined value, and a capacitor 230 having a predetermined capacitance. The drain terminal of the second FET 210 may be connected to the gate terminal of the first FET 110. The gate terminal may be connected to an output terminal of the external power source 10, a resistor 220 having the predetermined resistance value, and a capacitor 230 having a predetermined capacitance, and the source terminal may be connected to ground.

Meanwhile, the resistor 220 having the predetermined resistance value and the capacitor 230 having the predetermined capacitance are connected in parallel, and one end of the resistor 220 having the predetermined resistance value and the capacitor 230 having the predetermined capacitance connected in parallel is connected to the gate terminal of the second FET 210, and the other end is connected to the ground. When the external power source 10 is simultaneously applied to the first FET 110 and the second FET 210, the second FET 210 is turned on later by the time constant defined by the resistor 220 having the predetermined resistance value and the capacitor 230 having the predetermined capacity, thereby turning off the first FET 110 that becomes an on state as soon as the external power source is applied.

More specifically, when a voltage is simultaneously applied to the first FET 110 and the second FET 210, the resistor 220 having the predetermined resistance value and the capacitor 230 having the predetermined capacitance may be values for setting such that the second FET 210 is operated later than the first FET 110 by the predetermined time constant t.

The predetermined time constant t may be calculated by time constant t=predetermined resistance value R×predetermined capacitor capacity C.

When the external power source 10 is applied, by applying a wake-up voltage until the first switching unit 100 is turned off by the second switching unit 200 from the time when the external power source 10 is applied from the MCU power generation unit 20, in the case where a conventional external power source is applied to wake up the MCU automatically, the MCU 30 of the BMS in the sleep mode configured as described above may solve the problem that the MCU is awake until the external power source is released.

In other words, only for a predetermined time when the external power supply 10 is inputted, in the present invention, an MCU power generation unit applies a wake-up voltage to an MCU of a BMS, such that even if an external power source 10 is connected, the MCU 30 of the BMS may be switched to the sleep mode again by over-discharging the battery.

Figure 3:
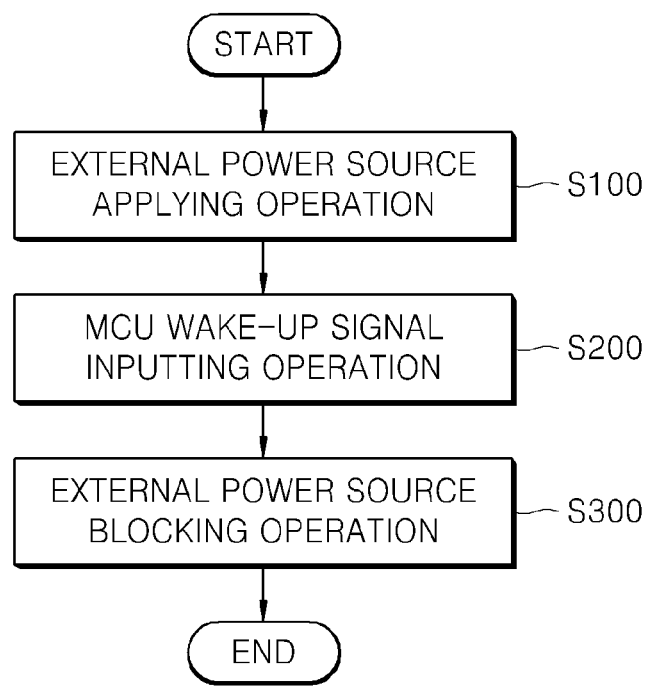
FIG. 3 is a flowchart illustrating a method of waking up a battery MCU in a sleep mode using an external power source according to an embodiment of the present invention.

2. MCU Wake-Up Method of BMS in Sleep Mode According to Embodiment of Present Invention FIG. 3 is a flowchart of an MCU wake-up method of a BMS in a sleep mode according to an embodiment of the present invention.

Hereinafter, a method for waking up the MCU of the BMS in the sleep mode according to the embodiment of the present invention will be described with reference to FIG. 3.

The MCU wake-up method of the BMS in the sleep mode according to an embodiment of the present invention includes an external power source applying operation S100 in which an external power source is applied, an MCU wake-up signal inputting operation S200 in which the external power source inputs a wake-up signal to the MCU through the MCU power generation unit when the external power source is applied, and an external power source blocking operation S300 for blocking an external power source applied to the MCU power generation unit after a predetermined time.

More specifically, the external power source applying operation S100 may turn on the first switching unit and the second switching unit by simultaneously applying an external power source to a first switching unit provided between the output terminal of the external power source and the MCU power generation unit, and a second switching unit provided between the output terminal of the external power source and the first switching unit.

Meanwhile, if the external power source is simultaneously applied to the first switching unit and the second switching unit, the second FET of the second switching unit is turned on later by a time constant defined by a resistor having a predetermined value of the second switching unit and a capacitor having a predetermined capacitance and is connected to ground. When the external power source is applied, the first FET of the first switching unit is immediately turned on, and the first switching unit connects the external power source and the MCU power generation unit. In the external power source blocking operation S300, when the second switching unit is turned on, the first switching unit is connected to the ground to disconnect the external power source and the MCU power generation unit.

Meanwhile, in the MCU wake-up signal inputting operation S200, from the time when the external power source is connected to the MCU power generation unit until the first switching unit is turned off by turning on the second switch unit, the wake-up signal may be inputted to the MCU of the BMS.

In the MCU wake-up method of the BMS according to the embodiment of the present invention, by generating a wake-up signal for a predetermined time from the time when the external power source is connected and waking up the MCU of the BMS, even if an external power source is connected, the BMS's MCU may be put back into sleep mode if battery over-discharging is detected.

That is, according to the present invention, when the MCU of the BMS is automatically waked up by a conventional external power source, the MCU of the BMS does not operate in the sleep mode again while the external power source is connected.

The present invention may wake up the MCU of the BMS operating in the sleep mode automatically without a switch operation of the user.

Although the device and method for waking up an MCU operating in a sleep mode have been described with reference to the specific embodiments, they are not limited thereto. Therefore, it will be readily understood by those skilled in the art that various modifications and changes can be made thereto without departing from the spirit and scope of the present invention defined by the appended claims.

What is claimed is:

1. A microcontroller (MCU) wake-up device of a battery management system (BMS) for controlling providing wake-up power to an MCU, the MCU wake-up device comprising:
   an MCU power generation unit configured to be connected to the MCU wake-up device to supply power to an MCU of the BMS, wherein the MCU power generation unit is switchably connectable to an external power source, and wherein the MCU power generation unit provides the wake-up power to the MCU only when the external power source is connected to the MCU power generation unit;
   a first switching unit configured to control connection between the external power source and the MCU power generation unit, such that the external power source is connected to the MCU power generation unit only when the first switching unit is turned on, wherein the first switching unit is configured to be turned on by a predetermined voltage applied from the external power source when the external power source is connected to the MCU wake-up device; and
   a second switching unit configured to control turning on and turning off the first switching unit, wherein the first switching unit is configured to turn off when the second switching unit is turned on, and wherein the second switching unit is configured to be turned on by the predetermined voltage applied from the external power source at a predetermined time after the external power source is connected to the MCU wake-up device, wherein the second switching unit comprises:
  the second FET;
  a resistor having a predetermined resistance value; and
  a capacitor having a predetermined capacitance,
wherein a drain terminal of the second FET is connected to a gate terminal of the first FET, a gate terminal is connected to an output terminal of the external power source, a resistor having the predetermined resistance value, and a capacitor having the predetermined capacitance, and a source terminal is connected to ground,
wherein the resistor having the predetermined resistance value and the capacitor having the predetermined capacitance are connected in parallel,
wherein one end of the resistor having the predetermined resistance value and the capacitor having the predetermined capacitance connected in parallel is connected to the gate terminal of the second FET and the other end is connected to the ground, and
wherein the predetermined time after the external power source is connected to the MCU wake-up device is a time constant defined by the resistor having the predetermined resistance value and the capacitor having a predetermined capacity.

2. The MCU wake-up device of claim 1, wherein the first switching unit comprises a first field effect transistor (FET),
wherein a drain terminal of the first FET is connected to an output terminal of the external power source, a source terminal is connected to the MCU power generation unit, and a gate terminal is connected to an output terminal of the external power source and a drain terminal of a second FET.

3. A method for waking up a microcontroller (MCU) of a battery management system (BMS), the method comprising:
  an MCU wake-up signal inputting operation in which an MCU power generation unit receives a wake-up signal from an external power source when voltage from the external power source is applied to the MCU power generation unit; and
  an external power source blocking operation for blocking the voltage applied from the external power source to the MCU power generation unit after a predetermined time;
wherein the MCU wake-up signal inputting operation further comprises: applying the voltage from the external power source to a first switching unit provided between an output terminal of the external power source and the MCU power generation unit so as to turn on the first switching unit; and
applying the voltage from the external power source to a second switching unit provided between the output terminal of the external power source and the first switching unit so as to turn on the second switching unit;
wherein the first switching unit includes a first FET and the second switching unit includes a second FET,
wherein applying the voltage from the external power source causes the first FET of the first switching unit to be immediately turned on and the second FET of the second switching unit to be turned on later than the first FET of the first switching unit by a time constant defined by a resistor having a predetermined value and a capacitor having a predetermined capacitance included in the second switching unit,
wherein the second switching unit is connected to ground;
wherein the MCU wake-up signal inputting further comprises the first switching unit connecting the external power source and the MCU power generation unit, and
wherein the external power source blocking operation further comprises the first switching unit being connected to the ground to disconnect the external power source and the MCU power generation unit.

4. The method of claim 3, wherein the MCU wake-up signal inputting operation further comprises the MCU power generation unit inputting a wake-up signal to the MCU of the BMS until the first switching unit is turned off by the second switch unit at a time after the external power source is connected to the MCU power generation unit.

* * * * *